United States Patent [19]
Zimmermann et al.

[11] 3,807,594
[45] Apr. 30, 1974

[54] ARRANGEMENT FOR SECURING THE HANDLE OF A VACUUM FLASK

[75] Inventors: Anso Zimmermann; Horst Dammer, both of Bad Hersfeld, Germany

[73] Assignee: Isolierflaschen KG-, Niederaula, Germany

[22] Filed: Jan. 29, 1973

[21] Appl. No.: 327,851

[30] Foreign Application Priority Data
Jan. 28, 1972   Germany............................ 2204142

[52] U.S. Cl........... 215/100 A, 220/94 R, 16/100 A
[51] Int. Cl............................................. B65d 23/10
[58] Field of Search....... 215/100, 100 A; 220/94 R, 220/85 D, 85 E, 96; 16/110 A, 114 A, 114 R; 222/566, 567, 573

[56] References Cited
UNITED STATES PATENTS
| | | | |
|---|---|---|---|
| 658,992 | 10/1900 | Miller | 16/100 A X |
| 2,896,812 | 7/1959 | Paprocki | 220/94 R X |
| 3,115,916 | 12/1963 | Stephens | 220/94 R X |
| 3,282,196 | 11/1966 | Manship | 215/100 A |
| 3,456,864 | 7/1969 | Trombley | 220/94 R X |
| 3,719,305 | 3/1973 | Pressnell | 215/100 A X |

Primary Examiner—Herbert F. Ross
Attorney, Agent, or Firm—Eric H. Waters

[57] ABSTRACT

An arrangement for securing the handle of a vacuum flask including an outer flask jacket and a headpiece having a handle connected thereto, the handle having a downwardly extending portion and a lower free end, a pin-shaped securing element extending from the lower free handle end at a predetermined oblique angle towards an aperture formed in the periphery of the jacket and being insertable therein in jamming engagement so as to form a permanent connection with the jacket.

6 Claims, 11 Drawing Figures

ARRANGEMENT FOR SECURING THE HANDLE OF A VACUUM FLASK

FIELD OF THE INVENTION

The present invention relates to an arrangement for securing the handle of a vacuum flask.

More particularly, the invention relates to an arrangement for securing a handle for a vacuum flask, wherein the upper end of the handle is connected with an outer jacket or with a headpiece of the flask, optionally having a pouring spout and receiving the sealing means, and wherein the handle extends downwardly in spaced relationship relative to the outer jacket and is secured, at its lower end extending towards the outer jacket by a securing element, in an aperture formed in the outer jacket.

DISCUSSION OF THE PRIOR ART

The assembly of a vacuum flask involves an extremely large amount of work, since the individual flask components, such as the insulating inner container, the outer jacket, the headpiece and, in general, the base part of the outer jacket which supports the insulating inner container, must be manually assembled. In known vacuum flasks of the type mentioned hereinabove, it is additionally necessary to connect the lower end of the handle, which is preferably formed of unitary structure with the headpiece, with the outer jacket. This connecting fastening must be of good aesthetic appearance and afford a rigid connection between the handle and the outer jacket. Handles having free lower ends have been found to be unsatisfactory since they tend to excessively stress the headpiece and, furthermore, must inherently be adequately strong in order to be able to withstand all loads.

The securing of the lower end of the handle to the outer jacket has hitherto been effected by firmly screwing the lower end from the inner side of the outer jacket prior to insertion of the insulating inner container. This is a mode of procedure which involves considerable wage costs, while also requiring the use of special tools such as offset screwdrivers, since the inner side of the outer jacket can only be reached from the bottom opening before the insertion therein of a base part.

In order to alleviate the foregoing disadvantages, it has previously been proposed in the handle securing means of the type under consideration, to initially divide or form the lower end of the handle into two spring-elastic, spreadable or compressible limbs arranged in fork-like manner, each of the free ends of which constitutes a hook serving as a securing element and concurrently a stop for the edge of a respective aperture formed in the jacket. With this type of arrangement, however, it becomes disadvantageous in that this securing structure can, even when the flask is assembled, be released by compressing the spring-elastic forked limbs. Furthermore, the durability of the securing means depends upon the quality of or the extent of spring-elastic retentivity of the limbs. Since such limbs are injection-molded from plastics, the resilience and therewith the quality of the securing means depends greatly on the temperature.

There has also been proposed a securing means of the type mentioned hereinabove, in which the lower end of the handle is provided with claw-like projections engaging, in the manner of a bayonet-type closure, behind an aperture formed in the outer jacket. This mode of securing affords a permanent and good connection, however, the size and configuration of the aperture may involve certain difficulties during manufacture of the outer jacket.

SUMMARY OF THE INVENTION

The present invention accordingly relates to the problem of improving handle securing means of the type described hereinabove in which a connection is formed by means of an extremely simple manufacturing technique, and in which the handle is permanently secured.

The invention solves the foregoing problem in that there is provided as securing element a pin arranged on an end face, facing the outer jacket, of the lower end of the handle and projecting at an angle obliquely from the end face, and in which the pin, on the upper end of the handle being connected with the outer jacket or the headpiece connected with the outer jacket, is jammed or wedged fast in an aperture in the outer jacket. Through rectilinear insertion of the pin in the direction in which it extends into the aperture formed in the outer jacket and by pivoting through the oblique angle, whereby the handle passes automatically into the desired securing position, securing of the lower end of the handle to the outer jacket is readily effected. The upper end of the handle or the headpiece has, meanwhile, been moved into a position relative to the upper zone of the outer jacket in which it may be connected to the outer jacket in any conventional manner. The lower end of the handle is, due to the jamming of the pin projecting at the angle obliquely from the end face of the lower end of the handle, non-displaceably connected with the outer jacket within the aperture formed therein.

The wedging or jamming effect of the pin in the aperture is so decisively attained, so as to reliably prevent any possibility of play or clearance, resulting in "wobbling" of the handle, in the connection between the handle and the outer jacket. Such play or clearance is obtained, for example, by effecting a simple "hooking-in" sequence. For this reason, furthermore, in an expedient embodiment of the invention, the shape and dimensions of the aperture formed in the outer jacket are adapted to conform with the cross-sectional shape of the pin.

In another preferred embodiment of the invention, the pin is, in longitudinal section, substantially of "droplet" form, the line of symmetry of the "droplet" shape including the angle with the end face, and with the aperture being a rectangular slot extending in the peripheral direction of the outer jacket, the width of the slot corresponding substantially to the maximum cross-sectional width of the "droplet" shape. The cross-section of the pin is thus still rectangular, the size of the rectangular cross-section varying, due to the "droplet" shape in longitudinal section, depending upon the position of the cross-section taken. The expression "substantially droplet-shape" is intended to define that the pin, with approximately this type of configuration may, after introduction into the aperture formed in the outer jacket, be particularly satisfactorily jammed or clamped without clearance, in the manner essential for carrying out the invention. When manufacturing the handle by injection molding, as is commonly the case, it becomes possible to readily extend over large tolerances with regard to the shaping of the pin.

In a further embodiment of the invention, the pin is trapezoidal in cross-section and is constituted of a prismatic web or land, the aperture being a slot extending in the peripheral direction of the outer jacket. A trapezoidal pin shape is in many instances simpler to manufacture by injection molding than other shapes.

The angle measured between the pin and a perpendicular to the end face is, in all embodiments, preferably an acute angle having an extent whereby the pin projects obliquely downwardly.

BRIEF DESCRIPTION OF THE DRAWINGS

Various embodiments of the invention are detailed hereinbelow, having reference to the accompanying drawings, in which.

DETAILED DESCRIPTION

Figure 1:
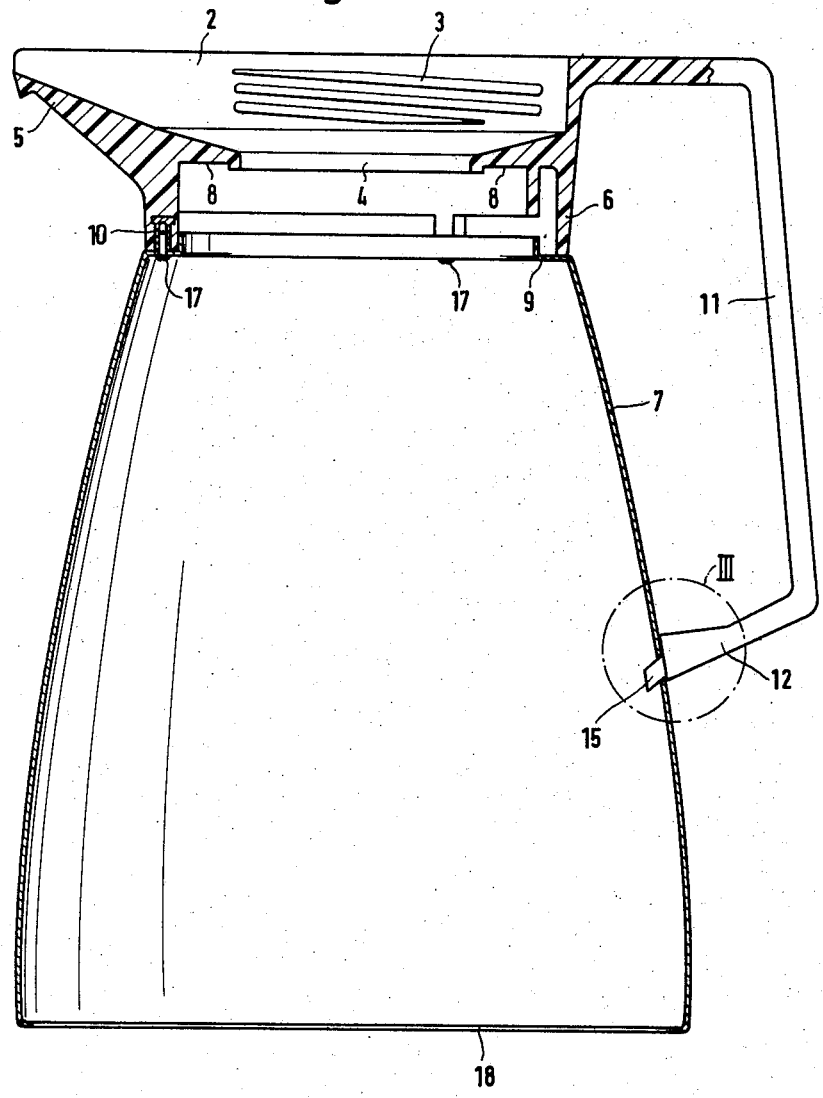
FIG. 1 shows an elevational sectional view of a headpiece with the handle and outer jacket for a vacuum flask.
Figure 2:
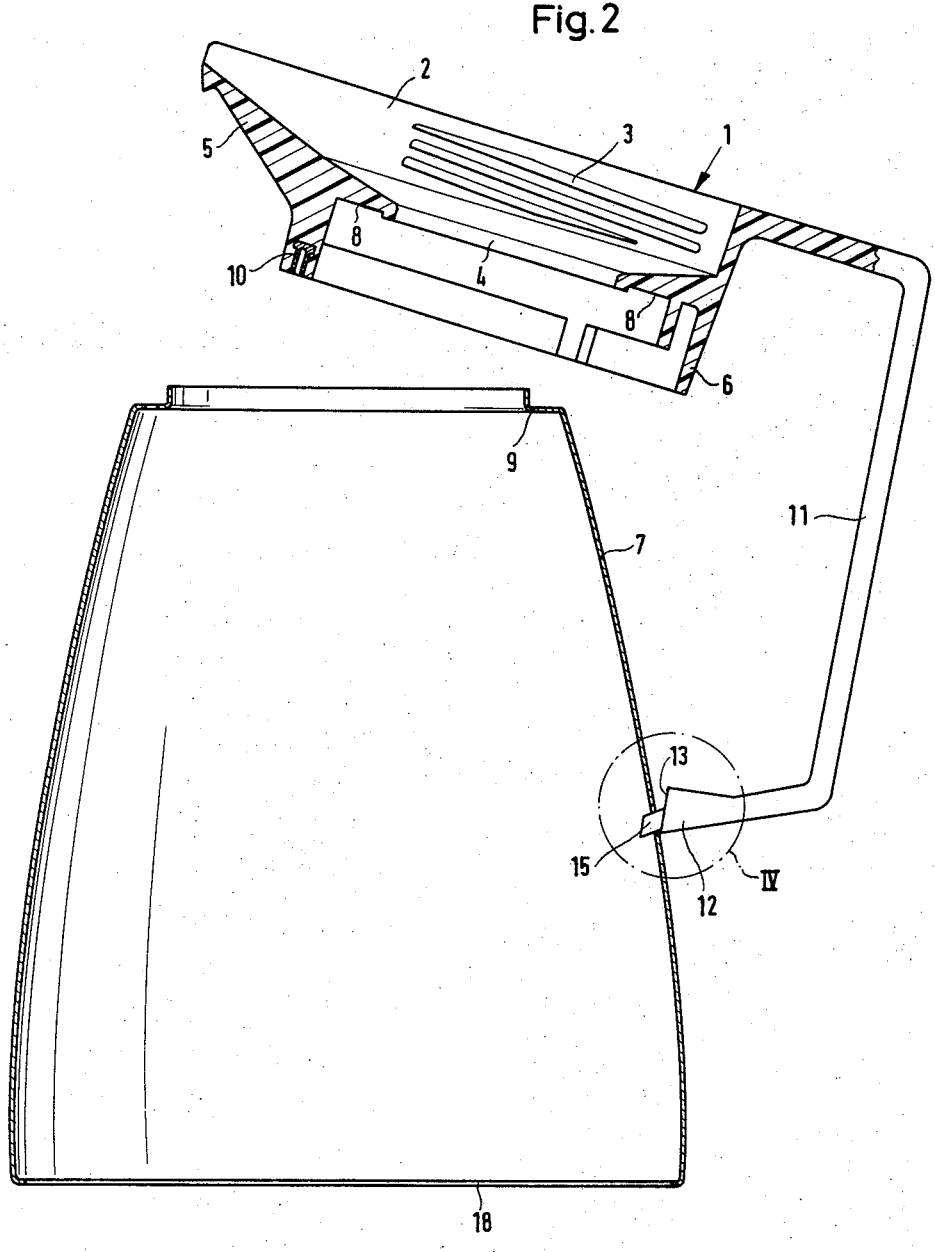
FIG. 2 shows an elevational sectional view of the flask of FIG. 1, with the headpiece not yet secured to the outer jacket.
Figure 3:
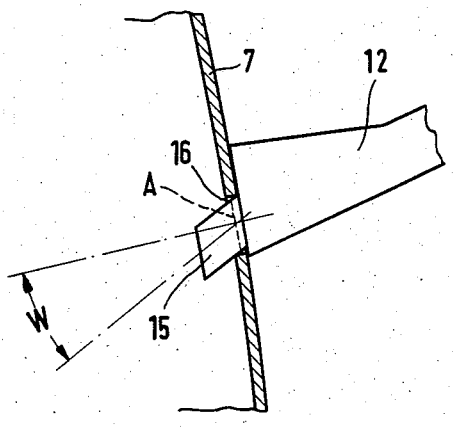
FIG. 3 shows an enlarged fragmentary sectional view of portion III in FIG. 1.
Figure 4:
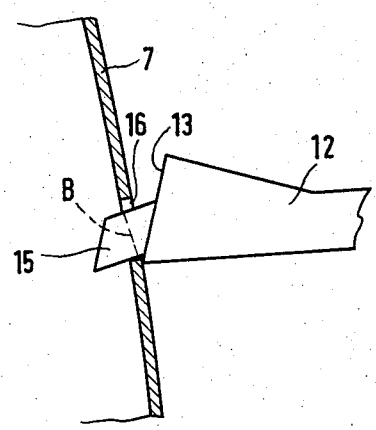
FIG. 4 shows an enlarged fragmentary sectional view of portion IV in FIG. 2.
Figure 5:
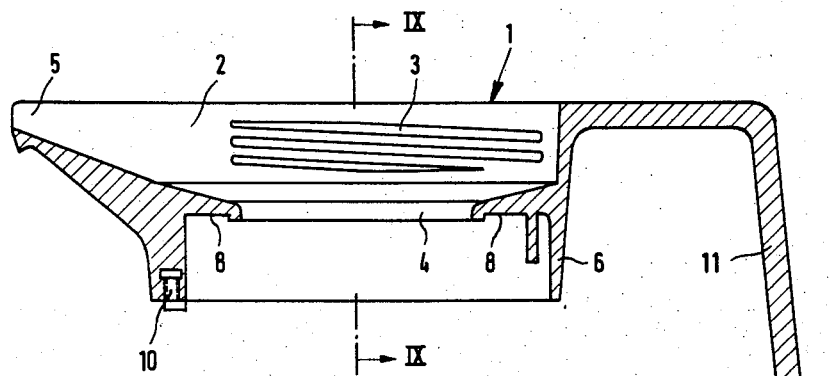
FIG. 5 shows elevational sectional view of a headpiece with the handle illustrating another embodiment of the pin.
Figure 6:
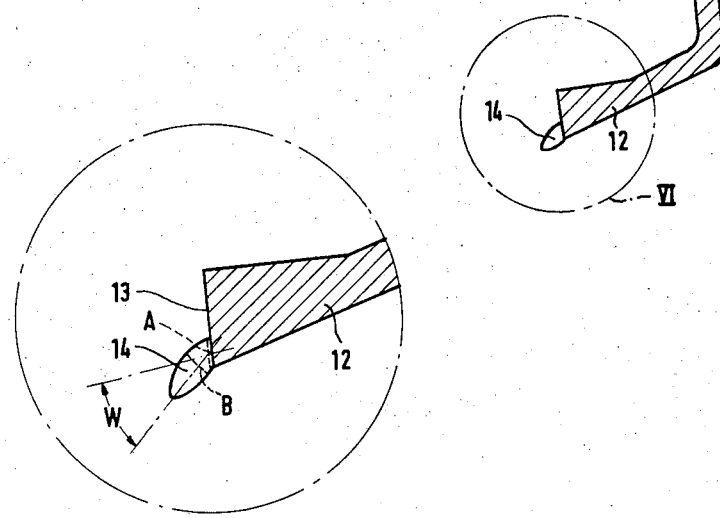
FIG. 6 shows an enlarged fragmentary sectional view of portion VI in FIG. 5.
Figure 8:
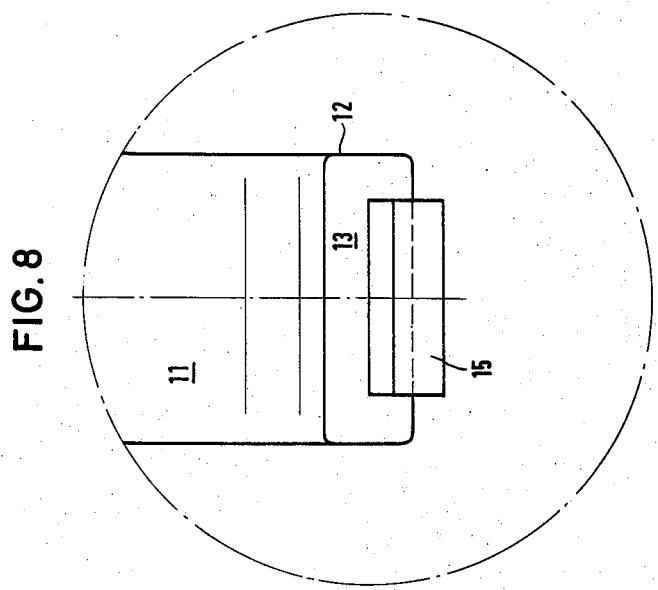
FIG. 8 shows an enlarged fragmentary sectional view of portion VIII in FIG. 7.
Figure 7:
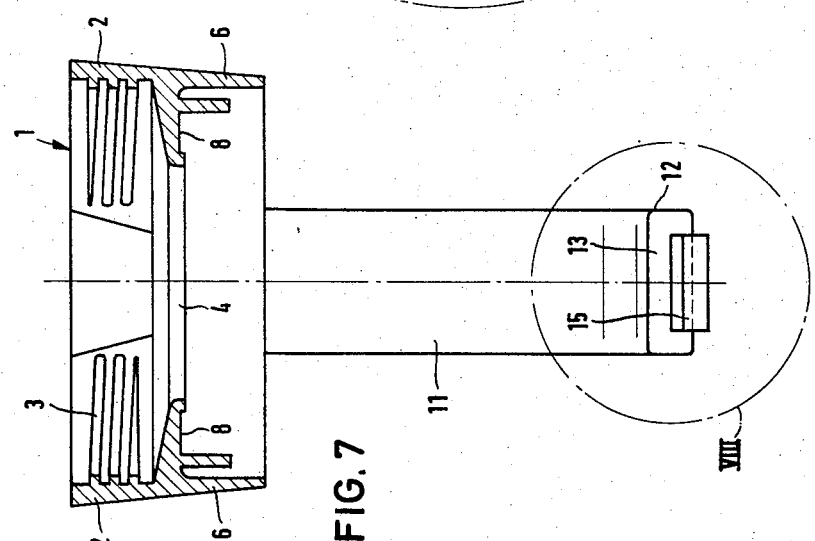
FIG. 7 shows an elevational sectional view of the head part with handle along a section offset 90° relative to FIG. 1.
Figure 10:
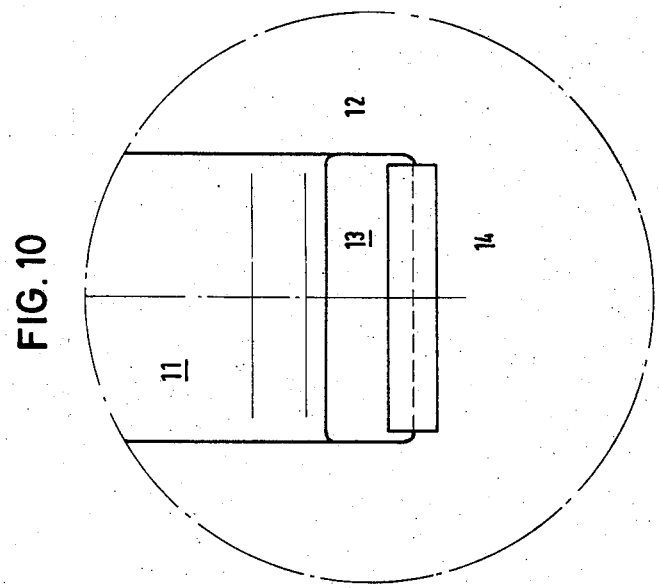
FIG. 10 shows an enlarged fragmentary sectional view of portion X in FIG. 9.
Figure 9:
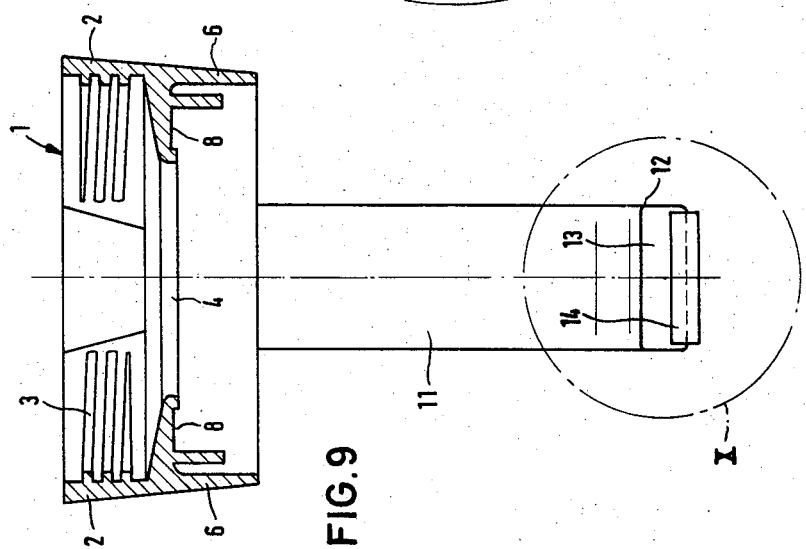
FIG. 9 shows an elevational sectional view of the headpiece with the handle taken along line XI—XI in FIG. 5.
Figure 11:
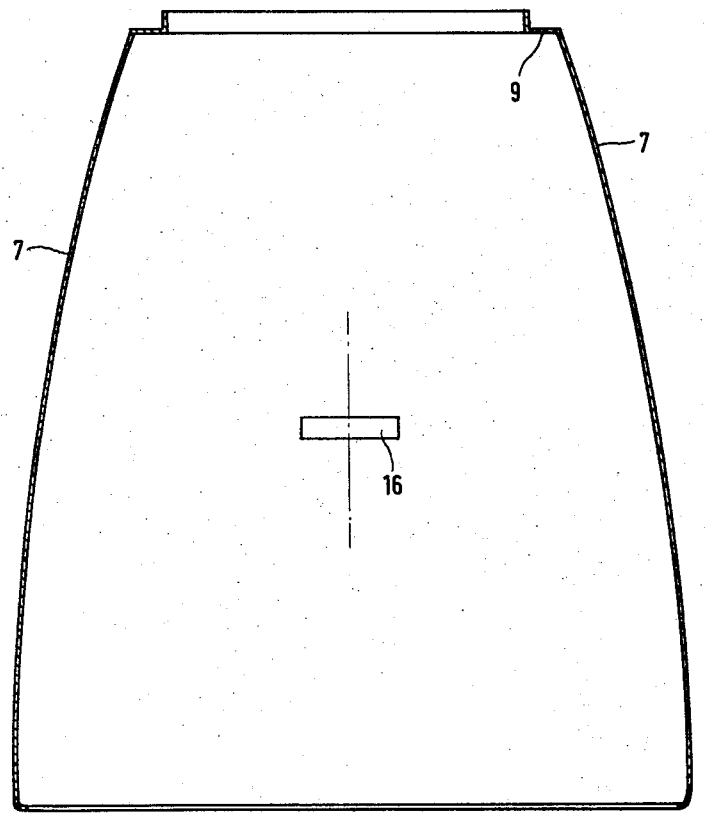
FIG. 11 shows an elevational sectional view of the outer jacket along section offset 90° relative to FIGS. 1 and 2.

In the following specification, like elements have, in the various embodiments, been given a same reference numerals. A vacuum flask includes a headpiece 1 having an upwardly-drawn, dished rim 2, in the inner walls of which there is formed a screw-thread 3 for receiving a screw closure means (not shown) for sealing an aperture 4. At its front side, the rim 2 is shaped in the form of a pouring spout 5. Furthermore, the headpiece 1 has a flanged rim 6, by means of which it bears on an outer jacket 7 of the flask. Connection of the outer jacket 7 with the headpiece 1 in the region of rim 6 is effected through screws 17 which are screwed through apertures formed in a bent-edge upper end 9 of the jacket 7, into tapped holes 10 formed in the headpiece 1. The insulating container (not shown) of the flask is, according to FIGS. 1 and 2, inserted from below through an open bottom side 18 of the outer jacket 7, aligned with the aperture 4 in the headpiece so as to form a seal with its rim surrounding its upper edge, and retained by a base part (not shown) connected with the jacket in the region of the open bottom side 18.

Connected to or formed in one piece with the headpiece 1 is a handle 11, the lower end 12 of which extends substantially perpendicular to the outer jacket 7. Located on an end face 13 of the lower end 12 of the handle 11 is a pin 14 or 15 which projects obliquely downwardly at an angle W. The pin 15 is, in the embodiment according to FIGS. 1 to 4 and 7, 8, shaped as a web or land which is trapezoidal in the longitudinal section thereof. In the embodiment according to FIGS. 5,6 and 9,10, the pin 15 is substantially "droplet"-like shaped in longitudinal section. The outer jacket 7 is formed with an aperture 16 in the shape of a rectangular slot corresponding to the size and cross-sectional dimensions of the pin 14 or 15.

The pin 14 or 15, when shaped as a web is, for securing the handle 11, introduced into the aperture 16, in a slightly oblique position defined by the angle W at which the pin 14 or 15 projects from the end face 13 (FIG. 2) and is, by pivoting the handle 11, jammed or wedged into the substantially perpendicular position (FIG. 1) in the aperture 16, with the end face 13 bearing on the outside of the jacket 7 in the region of the aperture 16. The jamming or wedging of the pin 15 in the aperture 16 is achieved by forcing the pin into the aperture 16 with a larger cross-section A than corresponds to its actual cross-section B. The pin 14 according to FIG. 6 has a corresponding effect. The headpiece 1, after wedging or jamming has been achieved in the manner described, is according to FIG. 1 in a position wherein the flange 6 is disposed over the bent-edge end 9 and can then be connected by introducing the screw 17 into the screw bores 10. Thereby, the securing of the lower end 12 of the limb 11 with the jacket 7 against reversed pivoting is assured, and the handle is permanently fastened by wedging or jamming effect. The end face 13 of the lower end 12 of the handle 11 bears against the outer side of the jacket 7 in a manner providing an attractive aesthetic appearance.

While there has been shown what is considered to be the preferred embodiment of the invention, it will be obvious that modifications may be made which come within the scope of the disclosure of the specification.

What we claim is:

1. An arrangement for securing a handle to a vacuum flask, comprising:
   an outer flask jacket having an aperture formed in the circumferential wall thereof; and
   a flask headpiece adapted to be positioned on the upper end of said jacket; a handle connected to said headpiece and extending therefrom, said handle including a downwardly depending portion extending in spaced relationship with said jacket and a lower end portion projecting towards said jacket; a handle securing means being formed at a free end face of said lower end portion in alignment with said aperture in said jacket and projecting at an oblique angle W relative to the end face, said securing means, upon positioning of said headpiece on said jacket, extending through said aperture so as to be jammed fast within said jacket.

2. An arrangement as claimed in claim 1, said handle securing means comprising a pin projecting towards said aperture in said jacket.

3. An arrangement as claimed in claim 2, said aperture in said jacket being dimensioned in correspondence with the cross-sectional dimensions of said pin.

4. An arrangement as claimed in claim 3, said pin being substantially droplet-shaped in longitudinal section and having a line of symmetry coinciding with an imaginary line defining said angle W relative to said handle end portion, said aperture being an essentially rectangular slot extending in the peripheral direction of said jacket, said pin having a width corresponding substantially to the maximum cross-sectional width of said droplet-shaped pin.

5. An arrangement as claimed in claim 3, said pin comprising a prigmatic land on the free end surface of said handle end portion, said land being trapezoidally-shaped in longitudinal section, said aperture in said jacket being essentially a rectangular slot extending in the peripheral direction of said jacket.

6. An arrangement as claimed in claim 2, said pin and an imaginary line extending normal to said free end surface of the handle end portion subtending an acute angle whereby said pin extends obliquely downwardly.

* * * * *

UNITED STATES PATENT OFFICE
CERTIFICATE OF CORRECTION

Patent No. 3,807,594          Dated April 30, 1974

Inventor(s) Anso Zimmermann et al.

It is certified that error appears in the above-identified patent and that said Letters Patent are hereby corrected as shown below:

On the cover sheet insert

-- [30] Foreign Application Priority Data

Germany    P2204142.5    January 28, 1972 --.

Signed and sealed this 24th day of September 1974.

(SEAL)
Attest:

McCOY M. GIBSON JR.            C. MARSHALL DANN
Attesting Officer              Commissioner of Patents